United States Patent
Liu et al.

(10) Patent No.: US 12,222,254 B2
(45) Date of Patent: Feb. 11, 2025

(54) SENSOR ASSEMBLY, FORCE DETECTION DEVICE AND METHOD, AND CONSTRUCTION MACHINERY

(71) Applicant: ZOOMLION HEAVY INDUSTRY SCIENCE AND TECHNOLOGY CO., LTD., Changsha (CN)

(72) Inventors: Yanbin Liu, Changsha (CN); Jie Wen, Changsha (CN); Lunwen Guo, Changsha (CN); Ling Fu, Changsha (CN); Kaige Jiang, Changsha (CN)

(73) Assignee: ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 360 days.

(21) Appl. No.: 17/789,432

(22) PCT Filed: Jul. 3, 2020

(86) PCT No.: PCT/CN2020/100180
§ 371 (c)(1),
(2) Date: Jun. 27, 2022

(87) PCT Pub. No.: WO2021/128798
PCT Pub. Date: Jul. 1, 2021

(65) Prior Publication Data
US 2023/0054665 A1   Feb. 23, 2023

(30) Foreign Application Priority Data
Dec. 27, 2019   (CN) .......................... 201911381561.X

(51) Int. Cl.
*G01L 1/22*   (2006.01)
(52) U.S. Cl.
CPC .......... *G01L 1/2218* (2013.01); *G01L 1/2231* (2013.01)

(58) Field of Classification Search
CPC ........................... G01L 1/2218; G01L 1/2231
See application file for complete search history.

(56) References Cited

U.S. PATENT DOCUMENTS

2011/0209562 A1* 9/2011 Ono .................... B60B 27/0094
                                                              73/862.045
2014/0224011 A1   8/2014 Burlage

FOREIGN PATENT DOCUMENTS

CN          85104807 B     8/1986
CN          2086900 U     10/1991
(Continued)

OTHER PUBLICATIONS

CN 85104807, machine translation. (Year: 1986).*

*Primary Examiner* — Kyung S Lee
(74) *Attorney, Agent, or Firm* — Volpe Koenig

(57) ABSTRACT

A sensor assembly, a force detection device and method, and construction machinery, the sensor assembly comprising a connecting part used for connecting a base to be tested and a bearing part used for bearing, the bearing part being connected to the connecting part, the bearing part comprising at least two sensing units with different measuring ranges, and the at least two sensing units being arranged to have a different initial gap (b1, b2) from the connecting part, so that corresponding initial gap (b1, b2) are eliminated when a load applied to the bearing part reaches different extents. The different initial gaps (b1, b2) are eliminated by means of the load reaching a different extent, so that the sensing units with different measuring ranges can provide detection feedback in the respective working conditions in which the units have the highest measurement precision and thereby ensure the accuracy of detection results.

17 Claims, 10 Drawing Sheets

(56) References Cited

FOREIGN PATENT DOCUMENTS

| | | |
|---|---|---|
| CN | 2685849 Y | 3/2005 |
| CN | 102221394 A | 10/2011 |
| CN | 102435274 A | 5/2012 |
| CN | 103017943 A | 4/2013 |
| CN | 106404527 A | 2/2017 |
| CN | 109813470 A | 5/2019 |
| CN | 209802546 U | 12/2019 |
| JP | 6335929 B2 | 5/2018 |
| WO | 2010057634 A1 | 5/2010 |

\* cited by examiner

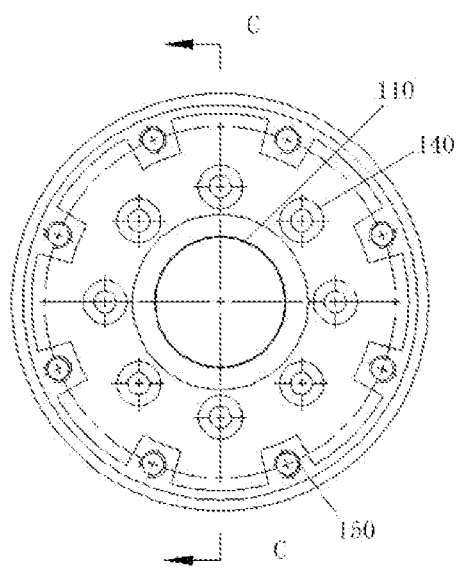 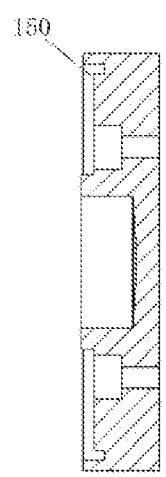 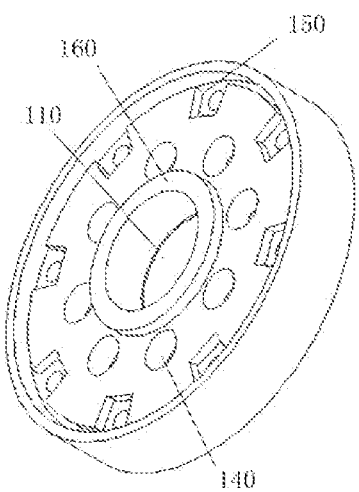
Fig. 4a      Fig. 4b      Fig. 4c
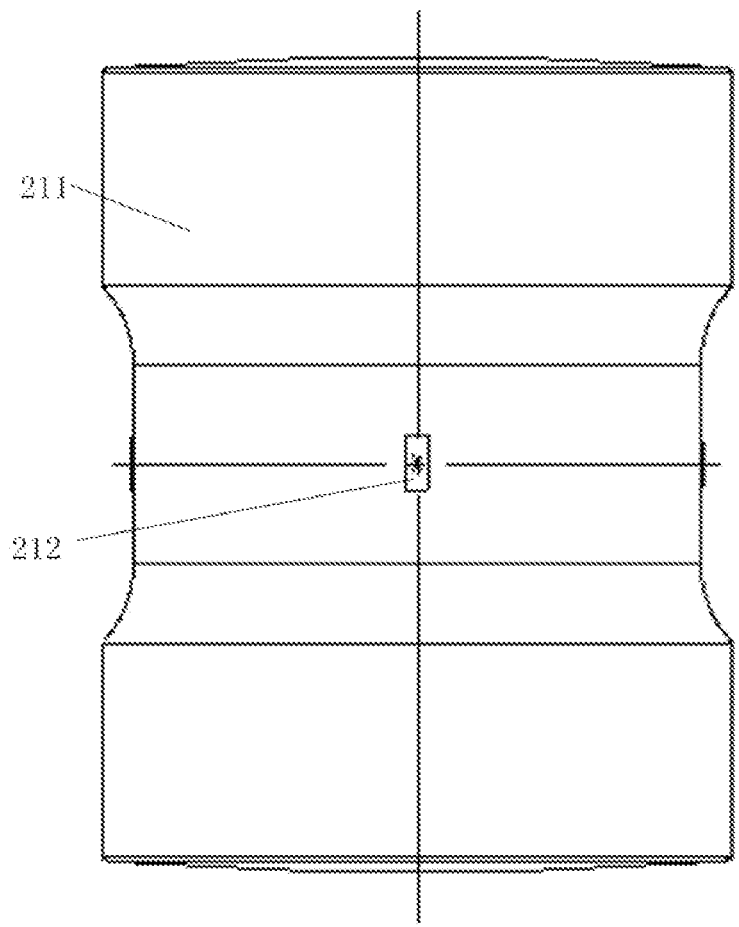
Fig. 5

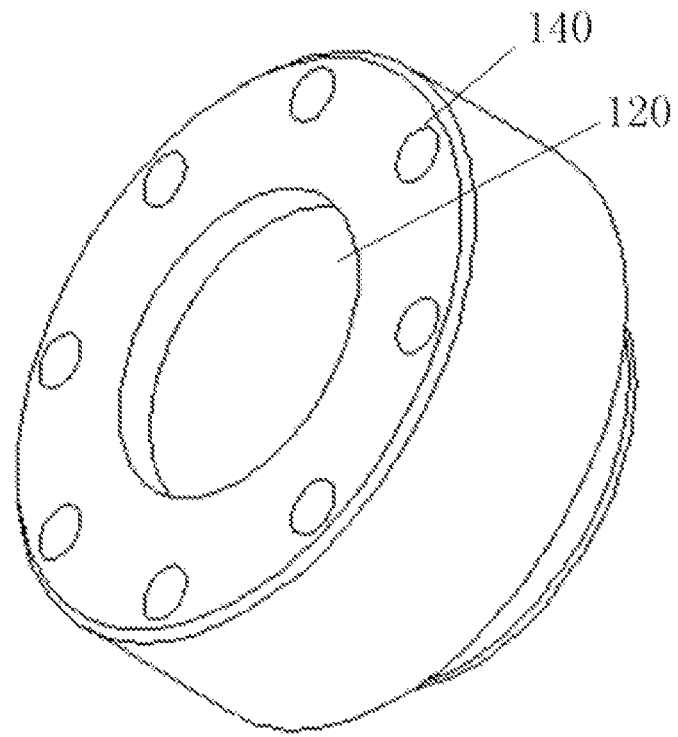
Fig. 11
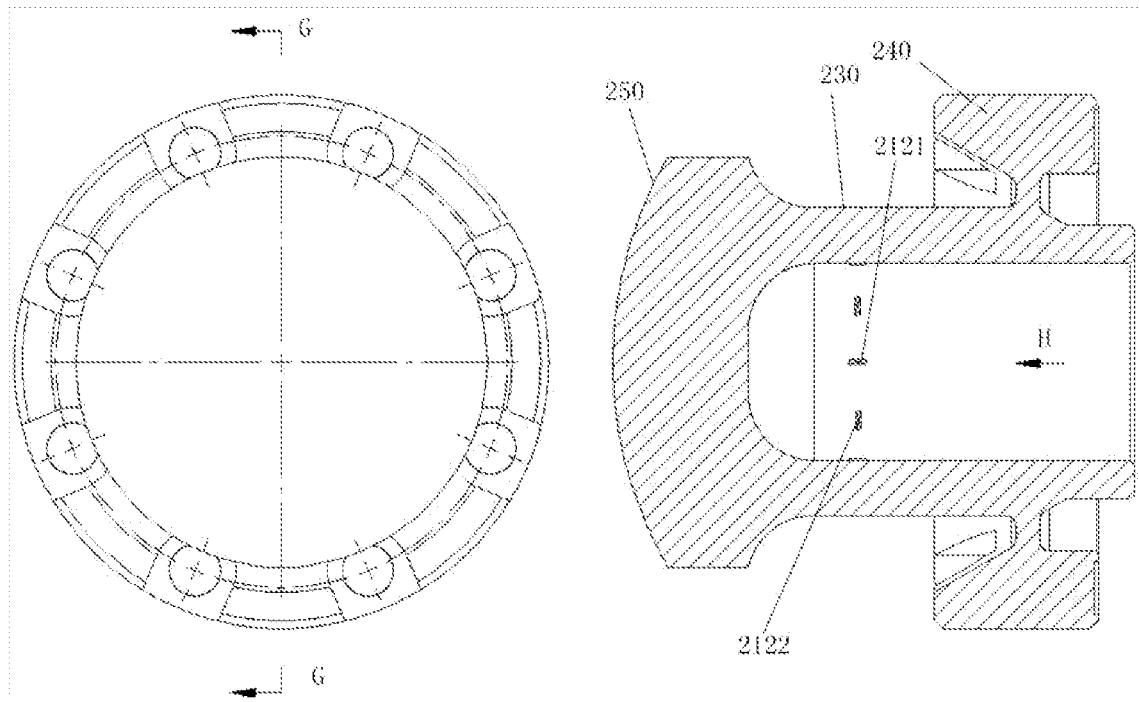
Fig. 12a                    Fig. 12b

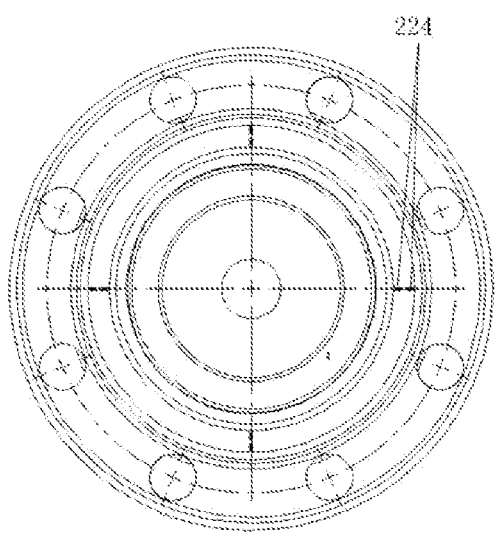 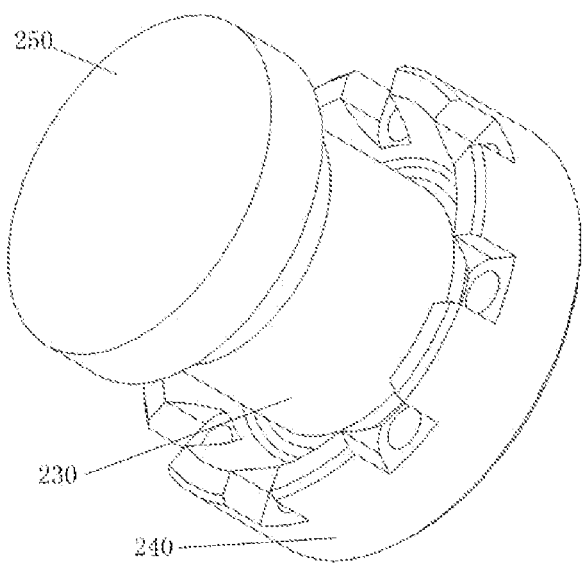
Fig. 12c                    Fig. 12d

SENSOR ASSEMBLY, FORCE DETECTION DEVICE AND METHOD, AND CONSTRUCTION MACHINERY

CROSS REFERENCE TO RELATED APPLICATIONS

This application is a 35 USC § 371 National Stage application of International Patent Application No. PCT/CN2020/100180, which was filed Jul. 3, 2020, entitled "SENSOR ASSEMBLY, FORCE DETECTION DEVICE AND METHOD, AND CONSTRUCTION MACHINERY" and claims priority to Chinese Patent Application No. 201911381561.X, filed Dec. 27, 2019 which is incorporated herein by reference as if fully set forth.

FIELD

The present disclosure relates to the detection of construction equipment, in particular to a sensor assembly, a force detection device and method, and construction machinery.

BACKGROUND

Construction equipment, such as cranes, usually have legs extend around them to provide support, in order to improve overturning resistance. The magnitude of the supporting force directly reflects the current supporting safety situation of a crane. For example, when the supporting forces of two adjacent legs are close to zero (a "non-supporting leg" state), it indicates that the crane is at a risk of instability. Therefore, it is highly necessary to accurately monitor the supporting forces of the legs. At present, in the technical scheme of detecting the supporting reaction forces by means of sensors, usually wide-range sensors are used in view of the high supporting reaction forces, but such wide-range sensors can't meet the requirement for measurement accuracy under low loads.

SUMMARY

An object of the present disclosure is to provide a sensor assembly to realize accurate detection.

To attain the object described above, in an aspect, the present disclosure provides a sensor assembly, which comprises a connecting part used for connecting a base to be tested and a bearing part used for bearing, wherein the bearing part is connected to the connecting part, the bearing part comprises at least two sensing units with different measuring ranges, and the at least two sensing units are arranged to have different initial gaps from the connecting part, so that corresponding initial gaps are eliminated when a load applied to the bearing part reaches different extents.

Preferably, the at least two sensing units comprise a first sensing unit and a second sensing unit, the measuring range of the first sensing unit is greater than that of the second sensing unit, the first sensing unit has a first initial gap b1 from the connecting part, and the second sensing unit has a second initial gap b2 from the connecting part.

Preferably, the sensor assembly comprises an output unit for outputting a measurement signal, which is configured to:
output a measurement result from the second sensing unit when the load applied to the bearing part is lower than a first predetermined value; and output a measurement result from the first sensing unit or the sum of a measurement result from the first sensing unit and a measurement result from the second sensing unit when the load applied to the bearing part is higher than the first predetermined value, preferably, the first predetermined value is 5-10% of a total measuring range of the sensor assembly; or output a measurement result from the second sensing unit before the smaller one of the first initial gap b1 and the second initial gap b2 is eliminated; and output a measurement result from the first sensing unit or the sum of a measurement result from the first sensing unit and a measurement result from the second sensing unit after the smaller one of the first gap b1 and the second initial gap b2 is eliminated.

Preferably, the first sensing unit has a columnar sensing structure and comprises a columnar body and a plurality of first strain gauges that are arranged around the circumference of the columnar body; the second sensing unit has a spoke-type sensing structure and comprises an outer rim, a hub, and spokes arranged between the outer rim and the hub, wherein the hub has a top surface protruding from the spokes and a blind hole that is arranged axially and open toward the connecting part, the spokes are provided with second strain gauges on a side, the columnar body is fitted in the blind hole, and the connecting part is provided with a first positioning hole for inserting the columnar body.

Preferably, the connecting part has a first surface opposite to the bottom surface of the columnar body, a second surface opposite to the bottom surface of the outer rim and a third surface opposite to the bottom surface of the hub, the first initial gap b1 is formed between the bottom surface of the columnar body and the first surface, the second initial gap b2 is formed between the bottom surface of the outer rim and the second surface, an anti-overload gap b3 is formed between the bottom surface of the hub and the third surface, the first initial gap b1 is smaller than the second initial gap b2, the second initial gap b2 is smaller than the anti-overload gap b3, and a first elastic gasket is arranged between the outer rim and the connecting part.

Preferably, the bearing part comprises a cylindrical body corresponding to a central portion of the connecting part and a peripheral portion corresponding to a peripheral portion of the connecting part, the cylindrical body and the peripheral portion are formed integrally, an inner wall of the cylindrical body is provided with the first strain gauges to form the first sensing unit, and the peripheral portion is provided with the second strain gauges to form the second sensing unit.

Preferably, two ends of the cylindrical body protrude from the end faces of the peripheral portion, the connecting part comprises a fourth surface opposite to an end face of the cylindrical body and a fifth surface opposite to an end face of the peripheral portion, the first initial gap b1 is formed between the end face of the cylindrical body and the fourth surface, and the second initial gap b2 is formed between the end face of the peripheral portion and the fifth surface.

Preferably, a second elastic gasket is arranged between the peripheral portion and the connecting part, and/or the connecting part has a second positioning hole for inserting the cylindrical body.

Preferably, the sensor assembly comprises an axis and is configured in a symmetric structure in relation to the axis, and the bearing part has a surface for bearing force, wherein the surface is a spherical surface and the axis passes through a center of sphere of the spherical surface.

The present disclosure further provides a force detection device, which comprises a force bearing device and the sensor assembly according to the present disclosure, wherein the connecting part is mounted to a force bearing end of the force bearing device.

The present disclosure further provides construction machinery, which comprises the force detection device according to the present disclosure.

Preferably, the construction machinery comprises legs, the force bearing devices are leg cylinders of the legs, preferably, the connecting part is mounted to an extended end of the piston rod of each leg cylinder.

The present disclosure further provides a force detection method for detecting an acting force borne on a force bearing device by using a bearing part including at least two sensing units, which comprises:

arranging the at least two sensing units to have different initial gaps from a connecting part connected to the force bearing device, so as to eliminate corresponding initial gaps when the acting force reaches different extents, thereby detect the acting force with different sensing units.

Preferably, the at least two sensing units comprise a first sensing unit and a second sensing unit, wherein the first sensing unit has a first initial gap b1 from the connecting part, the second sensing unit has a second initial gap b2 from the connecting part, the first sensing unit has a measuring range greater than that of the second sensing unit, and the method comprises:

using a measurement result from the second sensing unit as the detection result when the load applied to the bearing part is lower than a first predetermined value; and using a measurement result from the first sensing unit or the sum of a measurement result from the first sensing unit and a measurement result from the second sensing unit as the detection result when the load applied to the bearing part is higher than the first predetermined value, preferably, the first predetermined value is 5-10% of a total measuring range of the sensor assembly; or using a measurement result from the second sensing unit as the detection result before the smaller one of the first initial gap b1 and the second initial gap b2 is eliminated; and using a measurement result from the first sensing unit or the sum of a measurement result from the first sensing unit and a measurement result from the second sensing unit as the detection result after the smaller one of the first gap b1 and the second initial gap b2 is eliminated.

Preferably, the first sensing unit has a columnar sensing structure and comprises a columnar body and a plurality of first strain gauges that are arranged around the circumference of the columnar body; the second sensing unit has a spoke-type sensing structure and comprises an outer rim, a hub, and spokes arranged between the outer rim and the hub, the hub has a top surface protruding from the spokes and a blind hole that is arranged axially and open toward the connecting part, the spokes are provided with second strain gauges on a side, the columnar body is fitted in the blind hole, the connecting part is provided with a first positioning hole for inserting the columnar body, the connecting part has a first surface opposite to the bottom surface of the columnar body, a second surface opposite to the bottom surface of the outer rim, and a third surface opposite to the bottom surface of the hub, the first initial gap b1 is formed between the bottom surface of the columnar body and the first surface, the second initial gap b2 is formed between the bottom surface of the outer rim and the second surface, and an anti-overload gap b3 is formed between the bottom surface of the hub and the third surface, the first initial gap b1 is smaller than the second initial gap b2, the second initial gap b2 is smaller than the anti-overload gap b3, a first elastic gasket is arranged between the outer rim and the connecting part, and the method comprises:

using a measurement result from the second sensing unit as the detection result before the first initial gap b1 is eliminated; or using the sum of a measurement result from the first sensing unit and a measurement result from the second sensing unit as the detection result before the first initial gap b1 is eliminated.

Preferably, the bearing part comprises a cylindrical body corresponding to a central portion of the connecting part and a peripheral portion corresponding to a peripheral portion of the connecting part, the cylindrical body and the peripheral portion are formed integrally, an inner wall of the cylindrical body is provided with first strain gauges to form the first sensing unit, the peripheral portion is provided with second strain gauges to form the second sensing unit, two ends of the cylindrical body protrude from the end faces of the peripheral portion, the connecting part comprises a fourth surface opposite to an end face of the cylindrical body and a fifth surface opposite to an end face of the peripheral portion, the first initial gap b1 is formed between the end face of the cylindrical body and the fourth surface, the second initial gap b2 is formed between the end face of the peripheral portion and the fifth surface, and the method comprises:

using a measurement result from the second sensing unit as the detection result before the smaller one of the first initial gap b1 and the second initial gap b2 is eliminated; or using a measurement result from the first sensing unit as the detection result after the smaller one of the first initial gap b1 and the second initial gap b2 is eliminated.

With the technical scheme described above, different initial gaps are eliminated by applying the load to different extents, so that the sensing units with different measuring ranges can provide detection feedback in respective working conditions in which the units have the highest measurement precision, thereby the accuracy of detection results is ensured.

BRIEF DESCRIPTION OF THE DRAWINGS

FIGS. 4a-4c are a front view of the connecting part in FIG. 2, a sectional view of the connecting part along line C-C, and a perspective view of the connecting part respectively;

FIG. 5 is a schematic diagram of the first sensing unit in FIG. 2;

FIG. 11 is a perspective view of the connecting part in FIG. 10;

FIG. 12a-12d are a front view of the bearing part in FIG. 10, a sectional view of the bearing part along a line G-G, a view of the bearing part in a direction H, and a perspective view of the bearing part respectively.

REFERENCE NUMBERS

Figure 1:
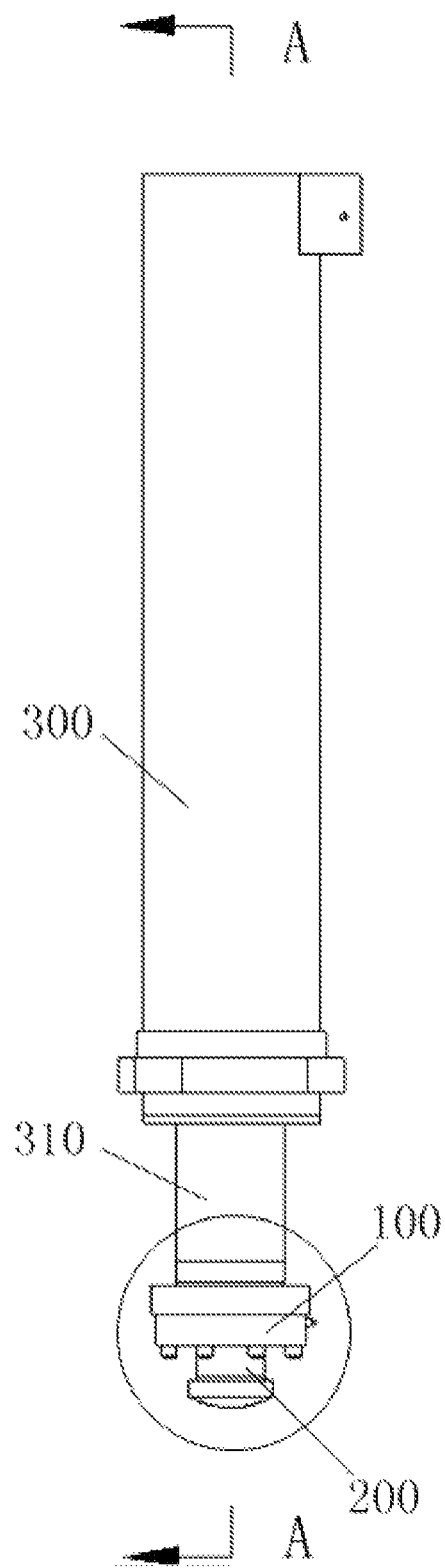
FIG. 1 is a schematic structural diagram of the supporting reaction force detection device of the leg according to an embodiment of the present disclosure.

100—connecting part, 110—first positioning hole, 120—second positioning hole, 130—positioning boss, 140—second mounting hole, 150—first elastic gasket groove, 160—anti-overload boss, 200—bearing part, 210—first sensing unit, 211—columnar body, 212—first strain gauge, 2121—longitudinal strain gauge, 2122—transverse strain gauge, 220—second sensing unit, 221—outer rim, 2221—blind hole, 222—hub, 223—spoke, 224—second strain gauge, 225—first elastic gasket, 230—cylindrical body, 240—peripheral portion, 241—second elastic gasket, 250—spherical surface, 260—cylindrical structure, 261—bearing bulb, 270—annular portion, 271—first mounting hole, 280—plate portion, 300—leg cylinder, 310—piston rod.

DETAILED DESCRIPTION

Hereunder some embodiments of the present disclosure will be detailed with reference to the accompanying drawings. It should be understood that the embodiments described herein are only provided to describe and explain the present disclosure, but are not intended to constitute any limitation to the present disclosure.

In the present disclosure, unless otherwise specified, the terms that denote orientations are used as follows; for example, "top", "bottom", "left", and "right" usually refer to top, bottom, left and right indicated in the accompanying drawings; and "inside" and "outside" usually refer to inside and outside with respect to the outlines of the components. Hereunder the present disclosure will be detailed in embodiments with reference to the accompanying drawings. Terms such as "around" and "annular" indicate that a closed ring in a shape, such as square shape or circular shape, is formed.

According to an aspect, the present disclosure provides a sensor assembly, which comprises a connecting part 100 used for connecting a base to be tested and a bearing part 200 used for bearing, wherein the bearing part 200 is connected to the connecting part 100, the bearing part 200 comprises at least two sensing units with different measuring ranges, and the at least two sensing units are arranged to have different initial gaps from the connecting part 100, so that corresponding initial gaps are eliminated when a load applied to the bearing part 200 reaches different extents.

Sensing units with different measuring ranges can provide different measurement accuracies under different loads. Specifically, a sensing unit with a smaller measuring range can provide higher measurement accuracy when it is used to detect smaller loads, while a sensing unit with a greater measuring range can provide higher measurement accuracy when it is used to detect greater loads.

In the present disclosure, different initial gaps are eliminated by applying the load to different extents, so that the sensing units with different measuring ranges can provide detection feedback in respective working conditions in which the units have the highest measurement precision, thereby the accuracy of detection results is ensured.

Different numbers of sensing units with different measuring ranges can be provided as required. In the following embodiments, the present disclosure will be described in an example of two sensing units, but the present disclosure is not limited to the scenarios where only two sensing units are provided. Specifically, the at least two sensing units comprise a first sensing unit 210 and a second sensing unit 220, the measuring range of the first sensing unit 210 is greater than that of the second sensing unit 220, the first sensing unit 210 has a first initial gap b1 from the connecting part 100, and the second sensing unit 220 has a second initial gap b2 from the connecting part 100.

In addition, appropriate detection modes can be set as required, so as to output a detection result via different sensing units a combination of the sensing units under different conditions. In a preferred embodiment of the present disclosure, the detection is carried out with a sensing unit with a smaller measuring range under lower loads, while the detection is carried out with a sensing unit with a greater measuring range under greater loads. To that end, preferably, the sensor assembly comprises an output unit for outputting a measurement signal, which is configured to:

output a measurement result from the second sensing unit 220 when the load applied to the bearing part 200 is lower than a first predetermined value; or output a measurement result from the first sensing unit 210 or the sum of a measurement result from the first sensing unit 210 and a measurement result from the second sensing unit 220 when the load applied to the bearing part 200 is higher than the first predetermined value, the first predetermined value is 5-10% of the total measuring range of the sensor assembly.

Preferably, the output unit is configured to output a measurement result from the second sensing unit 220 before the smaller one of the first initial gap b1 and the second initial gap b2 is eliminated; or output a measurement result from the first sensing unit 210 or the sum of a measurement result from the first sensing unit 210 and a measurement result from the second sensing unit 220 after the smaller one of the first gap b1 and the second initial gap b2 is eliminated.

Specifically, in the case that a first predetermined value is set, the first predetermined value is used as a threshold, the load is low when it is lower than the first predetermined value, and the measurement result from the second sensing unit 220 is outputted to achieve higher accuracy; the load is high when it is higher than the first predetermined value, and the measurement accuracy of the first sensing unit 210 with a higher measuring range is higher in that case. Therefore, the outputted measurement result shall include the detection result from the first sensing unit 210. A load equal to the first predetermined value may correspond to a maximum value in the measuring range of the second sensing unit 220.

Preferably, the elimination of the smaller one of the first initial gap b1 and the second initial gap b2 may be used as a threshold for introducing the measurement result from the first sensing unit 210. The elimination of the smaller one of the first initial gap b1 and the second initial gap b2 may correspond to a maximum value in the measuring range of the second sensing unit 220.

The first predetermined value and the elimination of the smaller one of the first initial gap b1 and the second initial gap b2 may be used in combination as a threshold for introducing the measurement result from the first sensing unit 210. That is to say, when the first initial gap b1 is eliminated, the load applied to the bearing part 200 just reaches the first predetermined value.

The output unit can realize the output of the measurement result under different conditions by means of appropriate circuit control. The specific circuit structure is a existing arrangement in the art and will not be further detailed here.

According to an embodiment of the present disclosure, as shown in FIGS. 3-6c, the first sensing unit 210 may have a columnar sensing structure and comprise a columnar body 211 and a plurality of first strain gauges 212 that are arranged around the circumference of the columnar body 211; the second sensing unit 220 has a spoke-type sensing structure and comprises an outer rim 221, a hub 222, and spokes 223 arranged between the outer rim 221 and the hub 222, wherein the hub 222 has a top surface protruding from the spokes 223 and a blind hole 2221 that is arranged axially and open toward the connecting part 100, the spokes 223 are provided with second strain gauges 224 on a side, the columnar body 211 is fitted in the blind hole 2221, and the connecting part 100 is provided with a first positioning hole 110 for inserting the columnar body 221

Second strain gauges 224 may be provided in the central areas of the two sides of the spokes 223. In addition, a plurality of second strain gauges 224 may be provided on each side, and adjacent second strain gauges 224 may be bonded in directions perpendicular to each other, for example, at ±45 degrees from the horizontal direction (the cross-sectional direction of the hub 222) respectively. Protective films may be applied between the spokes 223, so as to seal the areas where the second strain gauges 224 are mounted.

By fitting the columnar body 211 into the first positioning hole 110, the bearing part 200 can be prevented from being offset and deformed under high lateral load (a load deviating from the center line of the columnar body 211), thereby the second sensing unit 220 with a smaller measuring range can be protected against damage.

In addition, appropriate structures may be provided to form the first initial gap b1 and the second initial gap b2. For example, in the embodiment shown in FIG. 3, the connecting part 100 has a first surface opposite to the bottom surface of the columnar body 211, a second surface opposite to the bottom surface of the outer rim 221, and a third surface opposite to the bottom surface of the hub 222, the first initial gap b1 is formed between the bottom surface of the columnar body 211 and the first surface, the second initial gap b2 is formed between the bottom surface of the outer rim 221 and the second surface, an anti-overload gap b3 is formed between the bottom surface of the hub 222 and the third surface, the first initial gap b1 is smaller than the second initial gap b2 (i.e., the first initial gap b1 is smaller), and the second initial gap b2 is smaller than the anti-overload gap b3. A first elastic gasket 225 is arranged between the outer rim 221 and the connecting part 100.

The connecting part 100 may be provided with a first elastic gasket groove 150 for receiving the first elastic gasket 225. When the first elastic gasket 225 is exposed from the first elastic gasket groove 150, it can provide elasticity to decrease the overall rigidity of the second sensing unit 220 and the first elastic gasket 225 (i.e., the overall rigidity is smaller than the sum of the maximum rigidity of the first elastic gasket 225 and the rigidity of the second sensing unit 220 and is adjustable); when the first elastic gasket 225 is compressed to be fully accommodated in the first elastic gasket groove 150, the second sensing unit 220 is in direct contact with the connecting part 100, and the rigidity doesn't change anymore.

Thus, the second sensing unit 220 with a smaller measuring range always has a force transfer relationship with the connecting part 100 via the first elastic gasket 225 (however, the second initial gap between the second sensing unit 220 and the connecting part 100 is kept when the load is very low, i.e., the second sensing unit 220 and the connecting part 100 don't contact with each other directly), so that the second sensing unit 220 can sense the load from the beginning when the load is applied, in order to achieve higher measurement accuracy under low loads.

Next, the operation of the sensor assembly in the embodiment shown in FIGS. 3-6c in different measuring range stages of will be described.

When the bearing part 200 bears low acting force (e.g., lower than a first preset value), the first initial gap b1 is not eliminated, the first sensing unit 210 doesn't contact with the connecting part 100, and the second sensing unit 220 contacts with the connecting part 100 via the first elastic gasket 225. Therefore, the load is fully transferred by the connecting part 100 via the first elastic gasket 225 to the outer rim 221, the supporting reaction force F is essentially equal to the load F3 borne on the outer rim 221, and may be detected by the second strain gauges 224. Here, since the load is low, a detection result with higher accuracy can be provided by means of the second sensing unit 220 with a smaller measuring range. This state corresponds to a first measuring range stage of the sensor assembly.

When the acting force borne on the bearing part 200 reaches a predetermined value (e.g., greater than the first preset value) and the first initial gap b1 is eliminated but the second initial gap b2 is not eliminated yet, the second sensing unit 220 contacts with the connecting part 100 via the first elastic gasket 225, and the first sensing unit 210 contacts with the connecting part 100 via the columnar body 211; at that point, the first sensing unit 210 and the second sensing unit 220 bear the load jointly, and the supporting reaction force F is essentially equal to the sum of the load F3 borne on the outer rim 221 and the load F1 borne on the columnar body 211. Here, a detection result of the load with high accuracy can be provided by the first sensing unit 210 and the second sensing unit 220 respectively, the measurement result is provided by the first sensing unit 210 and the second sensing unit 220 jointly, and is the sum of a measured value from the first sensing unit 210 and a measured value from the second sensing unit 220. This state corresponds to a second measuring range stage of the sensor assembly.

When the acting force borne on the bearing part 200 reaches an extent that the second initial gap b2 is eliminated while the anti-overload gap b3 is not eliminated yet, the first elastic gasket 225 doesn't provide a rigidity reduction effect anymore, the second sensing unit 220 directly contacts with the connecting part 100 via the outer rim 221, and the first sensing unit 210 contacts with the connecting part 100 via the columnar body 211; at that point, the first sensing unit 210 and the second sensing unit 220 bear the load jointly, and the supporting reaction force F is essentially equal to the sum of the load F3 borne on the outer rim 221 and the load F1 borne on the columnar body 211. Here, a detection result of the load with high accuracy can be provided by the first sensing unit 210 and the second sensing unit 220 respectively, the measurement result is provided by the first sensing unit 210 and the second sensing unit 220 jointly, and is the sum of a measured value from the first sensing unit 210 and a measured value from the second sensing unit 220. This state corresponds to a third measuring range stage of the sensor assembly.

When the acting force borne on the bearing part 200 reaches an extent that the anti-overload gap b3 is eliminated, the connecting part 100 (e.g., an anti-overload boss 160 arranged in the central portion) is stopped by the hub 222, so that the spokes 222 with the second strain gauges 224 are protected against damage by excessive load. This state corresponds to an overload protection stage of the sensor assembly.

According to another embodiment of the present disclosure, as shown in FIGS. 7-12d, the bearing part 200 comprises a cylindrical body 230 corresponding to a central portion of the connecting part 100 and a peripheral portion 240 corresponding to a peripheral portion of the connecting part 100, the cylindrical body 230 and the peripheral portion 240 are formed integrally, an inner wall of the cylindrical body 230 is provided with the first strain gauges 212 to form the first sensing unit 210, and the peripheral portion 240 is provided with the second strain gauges 224 to form the second sensing unit 220.

The initial gaps may be formed according to the specific structural design. Specifically, two ends of the cylindrical body 230 protrude from the end faces of the peripheral portion 240, the connecting part 100 comprises a fourth surface opposite to an end face of the cylindrical body 230 and a fifth surface opposite to an end face of the peripheral portion 240, the first initial gap b1 is formed between the end face of the cylindrical body 230 and the fourth surface, and the second initial gap b2 is formed between the end face of the peripheral portion 240 and the fifth surface.

In addition, the first strain gauges 212 comprise longitudinal strain gauges 2121 arranged in the extension direction of the cylindrical body 230; preferably, the first strain gauges 212 further comprise transverse strain gauges 2122 arranged perpendicular to the extension direction of the cylindrical body 230, in order to improve the sensitivity of detection.

In this embodiment, two types of sensor assemblies may be used.

First Type

Figure 7:
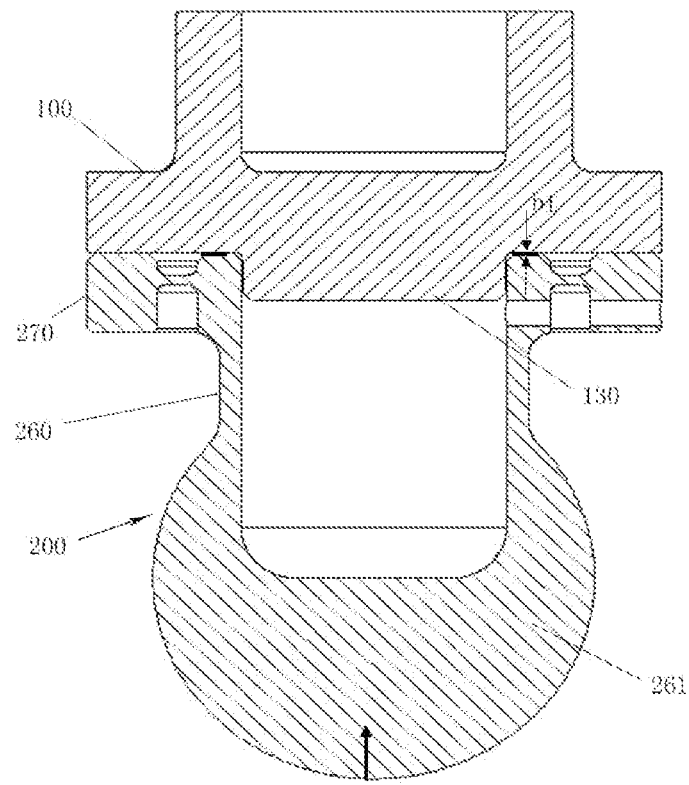
FIG. 7 is a schematic structural diagram of the sensor assembly according to another embodiment of the present disclosure.
Figures 8A, 8B:
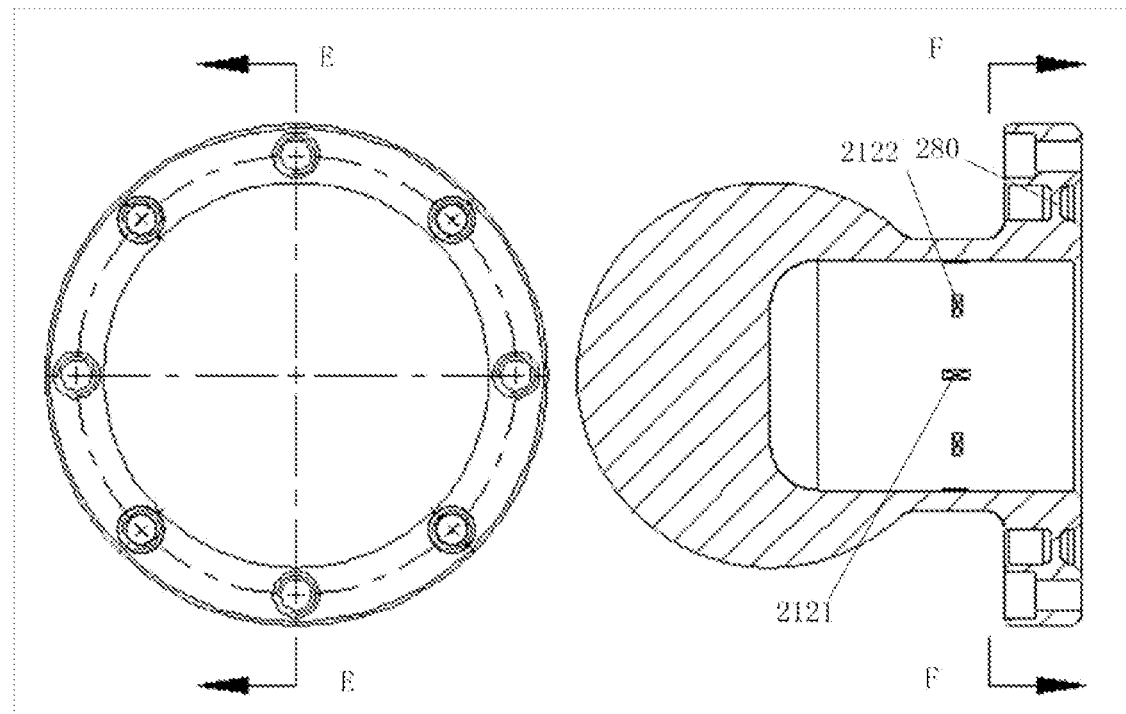
FIGS. 8a-8d are a front view of the bearing part in FIG. 7, a sectional view of the bearing part along line E-E, a sectional view of the bearing part along line F-F, and a perspective view of the bearing part respectively.
Figures 8C, 8D:
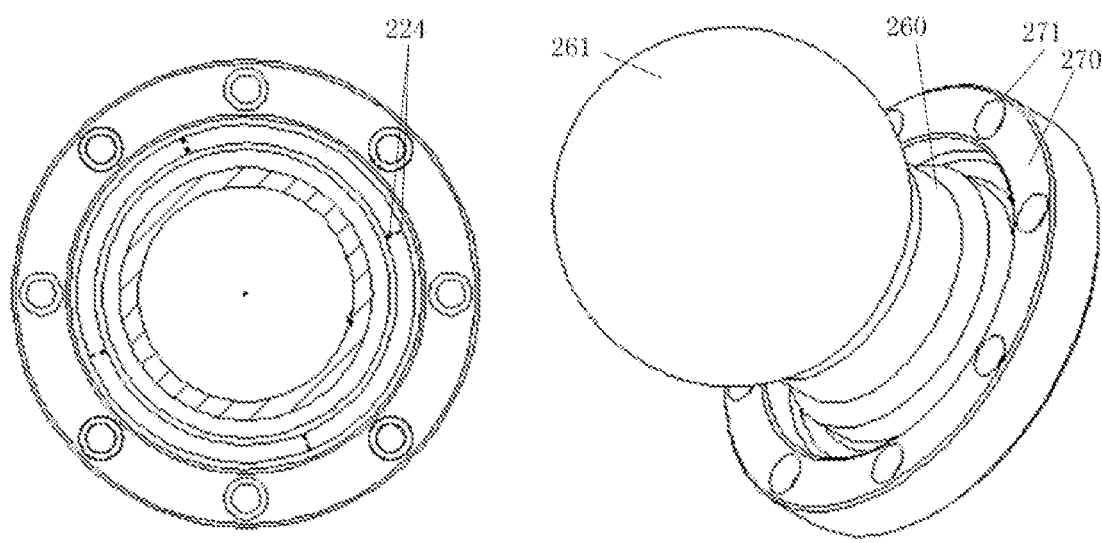
Figure 9:
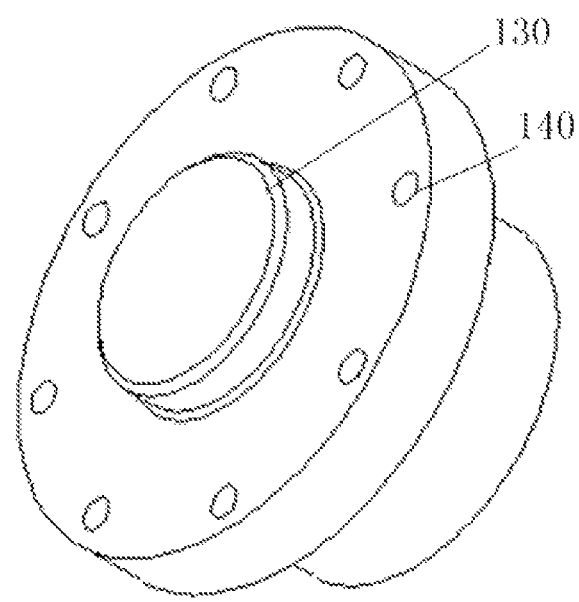
FIG. 9 is a perspective view of the connecting part in FIG. 7.
Figure 10:
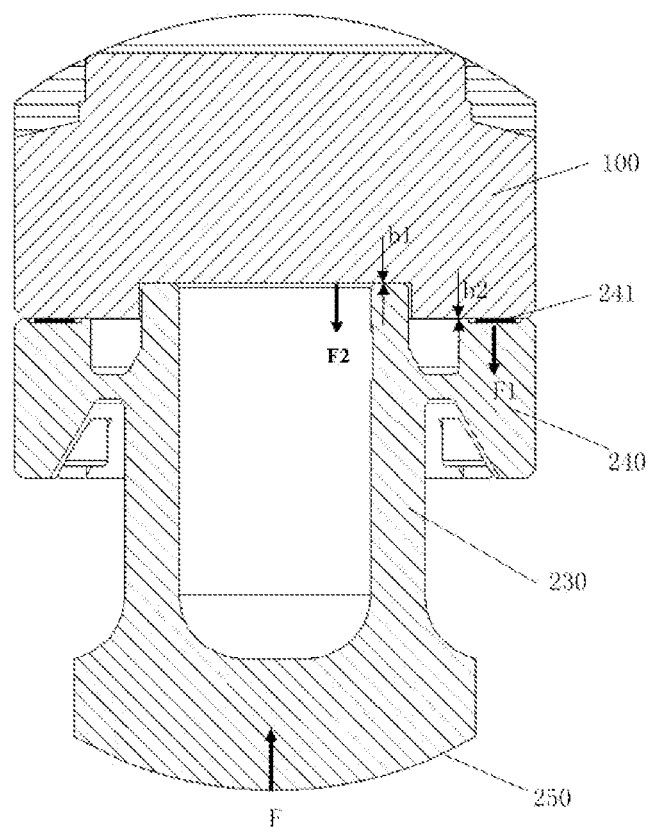
FIG. 10 is a schematic structural diagram of the sensor assembly according to another embodiment of the present disclosure.

As shown in FIGS. 7-9, the cylindrical body 230 comprises a cylindrical structure 260, the peripheral portion 240 comprises an annular portion 270 around the cylindrical structure 260 and a plate portion 280 arranged between the annular portion 270 and the cylindrical structure 260, the first strain gauges 212 are arranged on an inner wall of the cylindrical structure 260, and the second strain gauges 224 are arranged on the sides of the plate portion 280, wherein the first initial gap b1 is formed between the cylindrical structure 260 and the connecting part 100, the second initial gap b2 is formed between the plate portion 280 and the connecting part 100 and is equal to zero, i.e., the second initial gap b2 is smaller.

The connecting part 100 has a positioning boss 130 for inserting into a hollow portion of the cylindrical structure 260 to prevent the bearing part 200 from being offset and deformed owing to a high lateral load (i.e., a load deviating from the center line of the cylindrical structure 260), thereby the second sensing unit 220 with a smaller measuring range is protected against damage.

In addition, both the cylindrical structure 260 and the annular portion 270 may have an annular cross section, the annular portion 270 and the cylindrical structure 260 are arranged coaxially, the second strain gauges 224 may be arranged in pairs, and each pair of second strain gauges 224 are arranged near the two sides of the annular plate portion 280 respectively in the radial direction respectively (i.e., the pair of second strain gauges 224 are arranged in the radial direction of the plate portion 280, one second strain gauge 224 in the pair is arranged near the inner side of the plate portion 280 in the radial direction, while the other second strain gauge 224 in the pair is arranged near the outer side of the plate portion 280 in the radial direction), so as to measure the transverse strain of the cylindrical body 230. The second strain gauges 224 in the same pair may be configured to detect loads that are similar in magnitude but opposite to each other in direction during the detection.

Next, the operation of this type of sensor assembly in different measuring range stages will be described with reference to FIGS. 7-9.

When the bearing part 200 bears low acting force (e.g., lower than a first preset value), the first initial gap b1 is not eliminated, the first sensing unit 210 contacts with the connecting part 100, and the second sensing unit 220 doesn't contact with the connecting part 100 directly; therefore, the load is fully transferred by the connecting part 100 to the cylindrical structure 260 and is borne on the cylindrical structure 260, the annular portion 270 and the plate portion 280 that are integrally formed; at that point, since the load is low, the measurement result from the second sensing unit 220 with a smaller measuring range has higher accuracy; therefore, the detection may be carried out with the second strain gauges 224, so as to provide a detection result with higher accuracy. This state corresponds to a first measuring range stage of the sensor assembly.

When the acting force borne on the bearing part 200 reaches a predetermined value (e.g., higher than the first preset value) and the first initial gap b1 is eliminated, the load is fully transferred by the connecting part 100 to the cylindrical structure 260 and the annular portion 270, and is borne on the cylindrical structure 260, the annular portion 270 and the plate portion 280 that are integrally formed; at that point, since the load is high, the measurement result from the first sensing unit 210 with a greater measuring range has higher accuracy, while the second sensing unit 220 with a smaller measuring range only bears the load together with the first sensing unit 210 but is not suitable for providing a measurement result since the measured value from the second sensing unit 220 is not accurate anymore. Therefore, the detection may be carried out with the first strain gauge 212 so as to provide a detection result with higher accuracy. This state corresponds to a second measuring range stage of the sensor assembly.

Second Type

As shown in FIGS. 10-12d, the peripheral portion 240 is in a flange form and connected to the cylindrical body 230 via an annular plate, and the second strain gauges 224 are arranged on the annular plate. In addition, a second elastic gasket 241 is arranged between the peripheral portion 240 and the connecting part 100 to reduce the overall rigidity of the second sensing unit 220 and the second elastic gasket 241 as an integral structure. An accommodating groove may be arranged in the connecting part 100 and/or the peripheral portion 240 to facilitate the arrangement of the second elastic gasket 241. The first initial gap b1 is smaller than the second initial gap b2.

Moreover, the connecting part 100 has a positioning hole 120 for inserting the cylindrical body 230 to prevent the bearing part 200 from being offset and deformed owing to a high lateral load (i.e., a load deviating from the center line of the cylindrical body 230), thereby the second sensing unit 220 with a smaller measuring range is protected against damage.

Next, the operation of this type of sensor assembly in different measuring range stages will be described with reference to FIGS. 10-12d.

When the acting force borne on the bearing part 200 is low (e.g., lower than a first preset value), the first initial gap b1 is not eliminated, the first sensing unit 210 doesn't contact with the connecting part 100, and the second sensing unit 220 contacts with the connecting part 100 via the second elastic gasket 241; therefore, the load is fully transferred by the connecting part 100 to the peripheral portion 240, and is borne on the cylindrical body 230 and the peripheral portion 240 that are formed integrally. The supporting reaction force F is essentially equal to the load F1 borne on the peripheral portion 240, thereby can be detected by means of the second strain gauges 224. Here, since the load is low, a detection result with higher accuracy can be provided by means of the second sensing unit 220 with a smaller measuring range. This state corresponds to a first measuring range stage of the sensor assembly.

When the acting force borne on the bearing part 200 reaches a predetermined value (e.g., higher than the first preset value) and the first initial gap b1 is eliminated, the second sensing unit 220 contacts with the connecting part 100 via the second elastic gasket 241, the first sensing unit 210 contacts with the connecting part 100 via the cylindrical body 230, and the load is borne on the cylindrical body 230 and the peripheral portion 240 that are formed integrally; at that point, since the low is high, the measurement result from the first sensing unit 210 with a greater measuring range has higher accuracy, while the second sensing unit 220 with a smaller measuring range only bears the load together with the first sensing unit 210 but is not suitable for providing a measurement result since the measured value from the second sensing unit 220 is not accurate anymore. Therefore, the detection may be carried out with the first strain gauges 212 so as to provide a detection result with higher accuracy. This state corresponds to a second measuring range stage of the sensor assembly.

When the force borne on the bearing part 200 reaches an extent that the second initial gap b2 is eliminated, the second elastic gasket 241 doesn't provides a rigidity reduction effect anymore. The load is fully transferred by the connecting part 100 directly to the cylindrical body 230 and the peripheral portion 240, and is borne on the cylindrical body 230 and the peripheral portion 240 that are formed integrally; at that point, since the low is high, the measurement result from the first sensing unit 210 with a greater measuring range has higher accuracy, while the second sensing unit 220 with a smaller measuring range only bears the load together with the first sensing unit 210 but is not suitable for providing a measurement result since the measured value from the second sensing unit 220 is not accurate anymore. Therefore, the detection may be carried out with the first strain gauges 212 so as to provide a detection result with higher accuracy. This state corresponds to a second measuring range stage of the sensor assembly.

In the present disclosure, the bearing part 200 may be connected to the connecting part 100 in a variety of ways. For example, first mounting holes 140 and second mounting holes 271 may be arranged in the connecting part 100 and the bearing part 200 respectively, and the connecting part 100 may be connected to the bearing part 200 by fasteners inserted through the first mounting holes 140 and the second mounting holes 271.

In addition, preferably, the sensor assembly comprises an axis and is configured in a symmetric structure in relation to the axis, and the bearing part 200 has a surface for bearing force, wherein the surface is a spherical surface 250 and the axis passes through a center of sphere of the spherical surface. In that way, the bearing part 100 is configured to bear the load in the axial direction as far as possible. To obtain the spherical surface 250, a spherical surface 250 may be arranged at the end of the columnar body 211 and the cylindrical body 230 away from the connecting part 100, as in the embodiment shown in FIGS. 1-6c and 10-12d, or a bearing bulb 261 may be arranged at the end of the cylindrical structure 260 to form a spherical surface 250, as in the embodiment shown in FIGS. 7-9.

Figure 2:
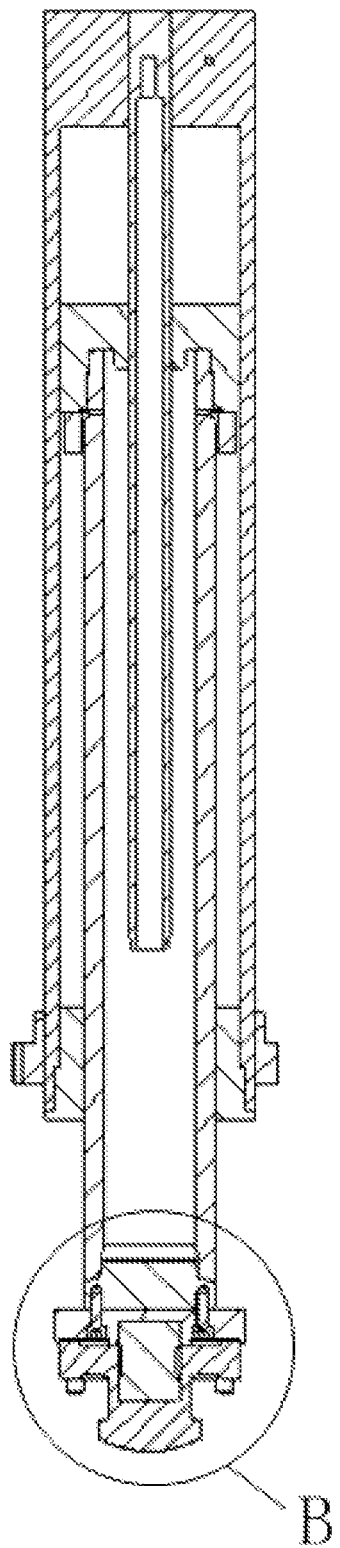
FIG. 2 is a sectional view along line A-A in FIG. 1.
Figure 3:
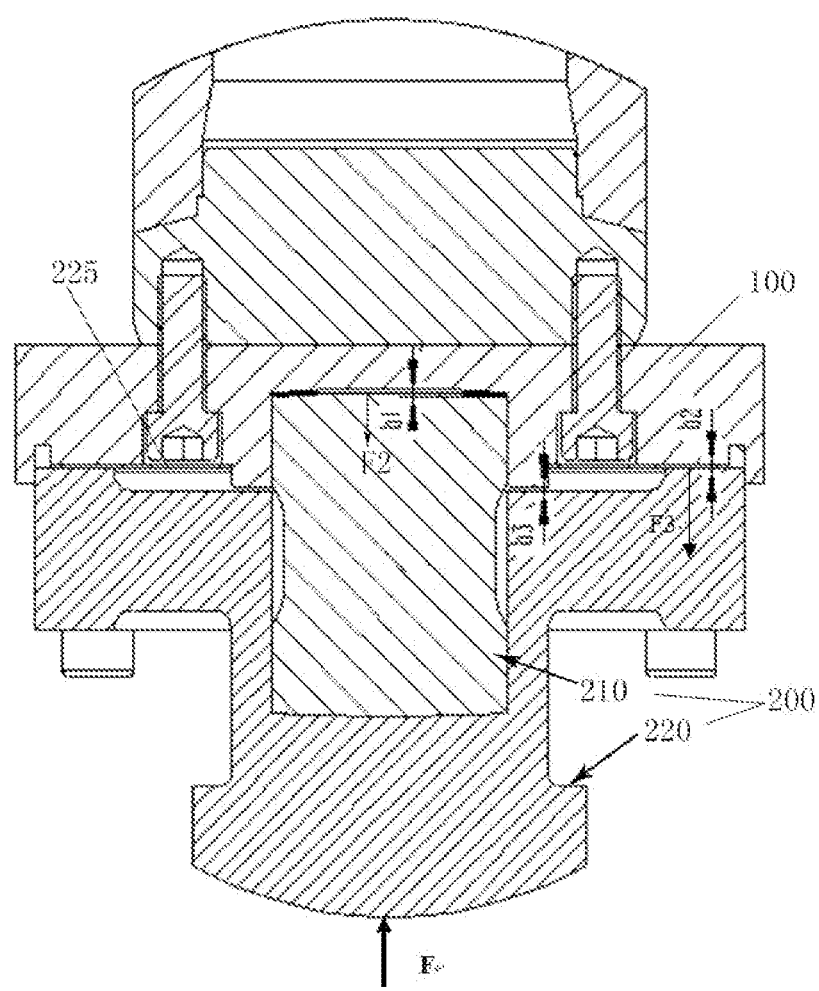
FIG. 3 is an enlarged view of the part B in FIG. 2.
Figures 6A, 6B, 6C:
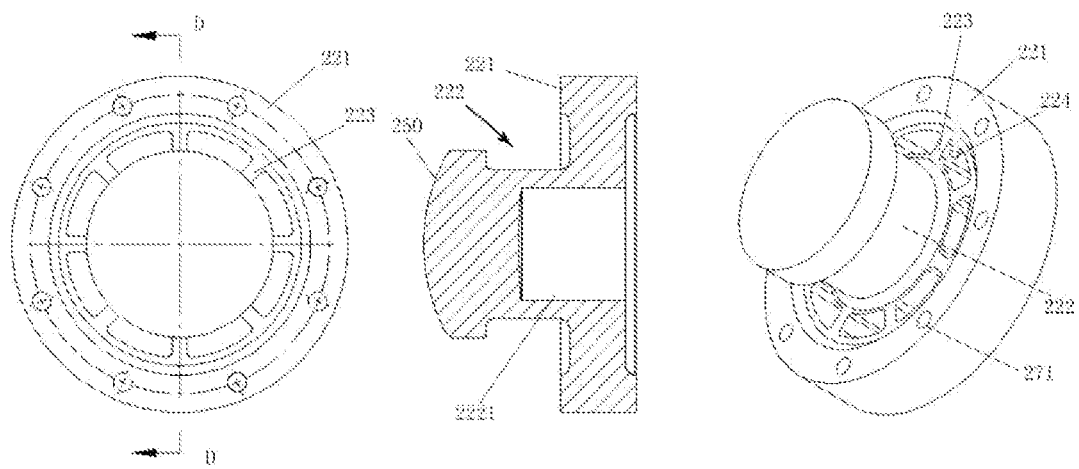
FIGS. 6a-6c are a front view of the second sensing unit in FIG. 2, a sectional view of the second sensing unit along line D-D, and a perspective view of the second sensing unit respectively.

According to another aspect, the present disclosure provides a force detection device, which comprises force bearing device 300 and the sensor assembly according to the present disclosure. As shown in FIGS. 1 and 2, the connecting part 100 is mounted to a force bearing end of the force bearing device 300. With the sensor assembly provided by the present disclosure, the acting force borne on the force bearing device 300 can be detected more accurately.

The present disclosure further provides construction machinery, which comprises the force detection device according to the present disclosure. The force detection device in the present disclosure may be used in construction machinery where the bearing force is to be detected.

For example, the construction machinery may comprise legs, and the force bearing devices 300 may be leg cylinders of the legs. The connecting part 100 may be mounted to an extended end of the piston rod 310 of each leg cylinder. Thus, the supporting reaction force on the legs can be detected accurately with the detection device provided by the present disclosure.

According to another aspect, the present disclosure provides a force detection method for detecting an acting force borne on a force bearing device 300 by using a bearing part 200 including at least two sensing units, which comprises:
    arranging the at least two sensing units to have different initial gaps from a connecting part 100 connected to the force bearing device 300, so as to eliminate corresponding initial gaps when the acting force reaches different extents, thereby detect the acting force with different sensing units.

As a specific embodiment, the force bearing device may be a bulb-type cylinder 300, e.g., a leg cylinder in construction machinery, and the measured acting force is the supporting reaction force of the leg. When the piston rods 310 extends out and contacts with the leg plate, the stress surface of the bearing part 200 is subjected to the supporting reaction force.

In the method provided by the present disclosure, different initial gaps are eliminated by applying the load to different extents, so that the sensing units with different measuring ranges can provide detection feedback in respective working conditions in which the units have the highest measurement precision, thereby the accuracy of detection results is ensured.

Different numbers of sensing units with different measuring ranges can be provided as required. In the following embodiments, the present disclosure will be described in an example of two sensing units, but the present disclosure is not limited to the scenarios where only two sensing units are provided. Specifically, the at least two sensing units comprise a first sensing unit 210 and a second sensing unit 220, wherein the first sensing unit 210 has a first initial gap b1 from the connecting part 100, the second sensing unit 220 has a second initial gap b2 from the connecting part 100, the first sensing unit 210 has a measuring range greater than that of the second sensing unit 220, and the method comprises:
    using a measurement result from the second sensing unit 220 as the detection result when the load applied to the bearing part 200 is lower than a first predetermined value; or using a measurement result from the first sensing unit 210 or the sum of a measurement result from the first sensing unit 210 and a measurement result from the second sensing unit 220 as the detection result when the load applied to the bearing part 200 is higher than the first predetermined value, preferably, the first predetermined value is 5-10% of the total measuring range of the sensor assembly; or using a measurement result from the second sensing unit 220 as the detection result before the smaller one of the first initial gap b1 and the second initial gap b2 is eliminated; or using a measurement result from the first sensing unit 210 or the sum of a measurement result from the first sensing unit 210 and a measurement result from the second sensing unit 220 as the detection result after the smaller one of the first gap b1 and the second initial gap b2 is eliminated.

Specifically, in the case that a first predetermined value is set, the first predetermined value is used as a threshold, the load is low when it is lower than the first predetermined value, and the measurement result from the second sensing unit 220 is outputted to achieve higher accuracy; the load is high when it is higher than the first predetermined value, and the measurement accuracy of the first sensing unit 210 with a higher measuring range is higher in that case. Therefore, the outputted measurement result shall include the detection result from the first sensing unit 210. A load equal to the first predetermined value may correspond to a maximum value in the measuring range of the second sensing unit 220.

Alternatively, the elimination of the smaller one of the first initial gap b1 and the second initial gap b2 may be used as a threshold for introducing the measurement result from the first sensing unit 210. The elimination of the smaller one of the first initial gap b1 and the second initial gap b2 may correspond to a maximum value in the measuring range of the second sensing unit 220.

The first predetermined value and the elimination of the smaller one of the first initial gap b1 and the second initial gap b2 may be used in combination as a threshold for introducing the measurement result from the first sensing unit 210. That is to say, when the first initial gap b1 is eliminated, the load applied to the bearing part 200 just reaches the first predetermined value.

The specific detection mode may be determined according to the specific structures of the sensing units. Preferably, the method provided by the present disclosure uses the sensor assembly provided by the present disclosure for the detection.

According to an embodiment of the present disclosure, as shown in FIGS. 1-6c, the first sensing unit 210 has a columnar sensing structure and comprises a columnar body 211 and a plurality of first strain gauges 212 that are arranged around the circumference of the columnar body 211; the second sensing unit 220 has a spoke-type sensing structure and comprises an outer rim 221, a hub 222, and spokes 221 arranged between the outer rim 221 and the hub 222, the hub 222 has a top surface protruding from the spokes 223 and a blind hole 2221 that is arranged axially and open toward the connecting part 100, the spokes 223 are provided with second strain gauges 224 on a side, the columnar body 211 is fitted in the blind hole 2221, the connecting part 100 is provided with a first positioning hole 110 for inserting the columnar body 211, the connecting part 100 has a first surface opposite to the bottom surface of the columnar body 211, a second surface opposite to the bottom surface of the outer rim 221, and a third surface opposite to the bottom surface of the hub 222, the first initial gap b1 is formed between the bottom surface of the columnar body 211 and the first surface, the second initial gap b2 is formed between the bottom surface of the outer rim 221 and the second surface, and an anti-overload gap b3 is formed between the bottom surface of the hub 222 and the third surface, the first initial gap b1 is smaller than the second initial gap b2 (i.e., the first initial gap b1 is smaller), the second initial gap b2 is smaller than the anti-overload gap b3, and the method comprises: using a measurement result from the second sensing unit 220 as the detection result before the first initial gap b1 is eliminated; or using the sum of a measurement result from the first sensing unit 210 and a measurement result from the second sensing unit 220 as the detection result before the first initial gap b1 is eliminated.

According to another embodiment of the present disclosure, as shown in FIGS. 7-12d, the bearing part 200 comprises a cylindrical body 230 corresponding to a central portion of the connecting part 100 and a peripheral portion 240 corresponding to a peripheral portion of the connecting part 100, the cylindrical body 230 and the peripheral portion 240 are formed integrally, an inner wall of the cylindrical body 230 is provided with first strain gauges 212 to form the first sensing unit 210, the peripheral portion 240 is provided with second strain gauges 224 to form the second sensing unit 220, two ends of the cylindrical body 230 protrude from the end faces of the peripheral portion 240, the connecting part 100 comprises a fourth surface opposite to an end face of the cylindrical body 230 and a fifth surface opposite to an end face of the peripheral portion 240, the first initial gap b1 is formed between the end face of the cylindrical body 230 and the fourth surface, the second initial gap b2 is formed between the end face of the peripheral portion 240 and the fifth surface, and the method comprises: using a measurement result from the second sensing unit 220 as the detection result before the smaller one of the first initial gap b1 and the second initial gap b2 is eliminated; or using a measurement result from the first sensing unit 210 as the detection result after the smaller one of the first initial gap b1 and the second initial gap b2 is eliminated.

While the present disclosure is described above in detail in some preferred embodiments with reference to the accompanying drawings, the present disclosure is not limited to those embodiments. Various simple variations may be made to the technical scheme of the present disclosure within the technical concept of the present disclosure. The specific technical features included in the present disclosure may be combined in any appropriate way. To avoid unnecessary repetition, the possible combinations are not described specifically in the present disclosure. However, such simple variations and combinations shall also be deemed as having been disclosed and falling in the scope of protection of the present disclosure.

The invention claimed is:

1. A sensor assembly, comprising a connecting part used for connecting a base to be tested and a bearing part used for bearing, wherein the bearing part is connected to the connecting part, the bearing part comprises:
   a first sensing unit; and
   a second sensing unit, wherein the measuring range of the first sensing unit is greater than that of the second sensing unit,
   the first sensing unit has a first initial gap b1 from the connecting part,
   the second sensing unit has a second initial gap b2 from the connecting part,
   the first initial gap b1 is smaller than the second initial gap b2, so that corresponding initial gaps are eliminated when a load applied to the bearing part reaches different extents, and
   the sensor assembly further comprises an elastic gasket arranged between the second sensing unit and the connecting part, such that:
   when an acting force borne on the bearing part is lower than a preset value, the first initial gap b1 is not eliminated and the first sensing unit does not contact the connecting part and the second sensing unit contacts the connecting part via the elastic gasket, and when the acting force borne on the bearing part reaches a predetermined value higher than the preset value, the first initial gap b1 is eliminated and the second sensing unit contacts the connecting part via the elastic gasket.

2. The sensor assembly of claim 1, comprising an output unit for outputting a measurement signal, which is configured to:

output a measurement result from the second sensing unit when the load applied to the bearing part is lower than a first predetermined value; and output a measurement result from the first sensing unit or the sum of a measurement result from the first sensing unit and a measurement result from the second sensing unit when the load applied to the bearing part is higher than the first predetermined value; or output a measurement result from the second sensing unit before the smaller one of the first initial gap b1 is eliminated; and output a measurement result from the first sensing unit or the sum of a measurement result from the first sensing unit and a measurement result from the second sensing unit after the first gap b1 is eliminated.

3. The sensor assembly of claim 1, wherein:

the first sensing unit has a columnar sensing structure and comprises a columnar body and a plurality of first strain gauges that are arranged around the circumference of the columnar body;

the second sensing unit has a spoke-type sensing structure and comprises an outer rim, a hub, and spokes arranged between the outer rim and the hub, wherein:

the hub has a top surface protruding from the spokes and a blind hole that is arranged axially and open toward the connecting part, the spokes are provided with second strain gauges on the sides, the columnar body is fitted in the blind hole, and the connecting part is provided with a first positioning hole for inserting the columnar body.

4. The sensor assembly of claim 3, wherein the connecting part has a first surface opposite to the bottom surface of the columnar body, a second surface opposite to the bottom surface of the outer rim and a third surface opposite to the bottom surface of the hub, the first initial gap b1 is formed between the bottom surface of the columnar body and the first surface, the second initial gap b2 is formed between the bottom surface of the outer rim and the second surface, an anti-overload gap b3 is formed between the bottom surface of the hub and the third surface, the second initial gap b2 is smaller than the anti-overload gap b3, and the elastic gasket comprises a first elastic gasket arranged between the outer rim and the connecting part.

5. The sensor assembly of claim 1, wherein the bearing part comprises a cylindrical body corresponding to a central portion of the connecting part and a peripheral portion corresponding to a peripheral portion of the connecting part, the cylindrical body and the peripheral portion are formed integrally, an inner wall of the cylindrical body is provided with the first strain gauges to form the first sensing unit, and the peripheral portion is provided with the second strain gauges to form the second sensing unit.

6. The sensor assembly of claim 5, wherein two ends of the cylindrical body protrude from the end faces of the peripheral portion, the connecting part comprises a fourth surface opposite to an end face of the cylindrical body and a fifth surface opposite to an end face of the peripheral portion, the first initial gap b1 is formed between the end face of the cylindrical body and the fourth surface, and the second initial gap b2 is formed between the end face of the peripheral portion and the fifth surface.

7. The sensor assembly of claim 6, wherein the elastic gasket comprises a second elastic gasket arranged between the peripheral portion and the connecting part, and/or the connecting part has a second positioning hole for inserting the cylindrical body.

8. The sensor assembly of claim 1, wherein the sensor assembly comprises an axis and is configured in a symmetric structure in relation to the axis, and the bearing part has a surface for bearing force, wherein the surface is a spherical surface and the axis passes through a center of sphere of the spherical surface.

9. A construction machinery, comprising a force detection device, wherein the force detection device comprises a force bearing device and a sensor assembly comprising a connecting part used for connecting a base to be tested and a bearing part used for bearing, wherein the bearing part is connected to the connecting part, the bearing part comprises:

a first sensing unit; and a second sensing unit, wherein the measuring range of the first sensing unit is greater than that of the second sensing unit, the first sensing unit has a first initial gap b1 from the connecting part, the second sensing unit has a second initial gap b2 from the connecting part, the first initial gap b1 is smaller than the second initial gap b2, so that corresponding initial gaps are eliminated when a load applied to the bearing part reaches different extents, and the sensor assembly comprises an elastic gasket arranged between the second sensing unit and the connecting part, such that:

when an acting force borne on the bearing part is lower than a preset value, the first initial gap b1 is not eliminated and the first sensing unit does not contact the connecting part and the second sensing unit contacts the connecting part via the elastic gasket, and when the acting force borne on the bearing part reaches a predetermined value higher than the preset value, the first initial gap b1 is eliminated and the second sensing unit contacts the connecting part via the elastic gasket.

10. The construction machinery of claim 9, wherein the construction machinery comprises legs, and the force bearing devices are leg cylinders of the legs.

11. A force detection method for detecting an acting force borne on a force bearing device by using a bearing part including a first sensing unit and a second sensing unit, the measuring range of the first sensing unit is greater than that of the second sensing unit, wherein the method comprises:

arranging the first sensing unit to have a first initial gap b1 from a connecting part connected to the force bearing device and the second sensing unit to have a second initial gap b2 from the connecting part, the first initial gap b1 being smaller than the second initial gap b2 so as to eliminate corresponding initial gaps when the acting force reaches different extents, thereby detect the acting force with different sensing units.

12. The method of claim 11, wherein using a measurement result from the second sensing unit as the detection result when the load applied to the bearing part is lower than a first predetermined value; and using a measurement result from the first sensing unit or the sum of a measurement result from the first sensing unit and a measurement result from the second sensing unit as the detection result when the load applied to the bearing part is higher than the first predetermined value; or using a measurement result from the second sensing unit as the detection result before the first initial gap b1 is eliminated; and using a measurement result from the first sensing unit or the sum of a measurement result from the first sensing unit and a measurement result from the second sensing unit as the detection result after the first gap b1 is eliminated.

13. The method of claim 12, wherein;

the first sensing unit has a columnar sensing structure and comprises a columnar body and a plurality of first strain gauges that are arranged around the circumference of the columnar body;

the second sensing unit has a spoke-type sensing structure and comprises an outer rim, a hub, and spokes arranged between the outer rim and the hub, wherein:

the hub has a top surface protruding from the spokes and a blind hole that is arranged axially and open toward the connecting part, the spokes are provided with second strain gauges on a side, the columnar body is fitted in the blind hole, the connecting part is provided with a first positioning hole for inserting the columnar body, the connecting part has a first surface opposite to the bottom surface of the columnar body, a second surface opposite to the bottom surface of the outer rim, and a third surface opposite to the bottom surface of the hub, the first initial gap b1 is formed between the bottom surface of the columnar body and the first surface, the second initial gap b2 is formed between the bottom surface of the outer rim and the second surface, and an anti-overload gap b3 is formed between the bottom surface of the hub and the third surface, the first initial gap b1 is smaller than the second initial gap b2, the second initial gap b2 is smaller than the anti-overload gap b3, and a first elastic gasket is arranged between the outer rim and the connecting part, and the method comprises:

using a measurement result from the second sensing unit as the detection result before the first initial gap b1 is eliminated; or using the sum of a measurement result from the first sensing unit and a measurement result from the second sensing unit as the detection result after the first initial gap b1 is eliminated.

14. The method of claim 12, wherein the bearing part comprises a cylindrical body corresponding to a central portion of the connecting part and a peripheral portion corresponding to a peripheral portion of the connecting part, the cylindrical body and the peripheral portion are formed integrally, an inner wall of the cylindrical body is provided with first strain gauges to form the first sensing unit, the peripheral portion is provided with second strain gauges to form the second sensing unit, two ends of the cylindrical body protrude from the end faces of the peripheral portion, the connecting part comprises a fourth surface opposite to an end face of the cylindrical body and a fifth surface opposite to an end face of the peripheral portion, the first initial gap b1 is formed between the end face of the cylindrical body and the fourth surface, the second initial gap b2 is formed between the end face of the peripheral portion and the fifth surface, and the method comprises:

using a measurement result from the second sensing unit as the detection result before the first initial gap b1 is eliminated; or using a measurement result from the first sensing unit as the detection result after the first initial gap b1 is eliminated.

15. The construction machinery of claim 10, wherein the connecting part is mounted to an extended end of the piston rod of each leg cylinder.

16. The method of claim 12, wherein the first predetermined value is 5-10% of a total measuring range of the sensor assembly.

17. The sensor assembly of claim 2, wherein the first predetermined value is 5-10% of a total measuring range of the sensor assembly.

* * * * *